Oct. 15, 1929.  A. L. DE LEEUW  1,732,122
TRANSMISSION SYSTEM
Filed Feb. 25, 1925  2 Sheets-Sheet 2

Inventor
Adolph L De Leeuw
By Attorney
Albert F Nathan

Patented Oct. 15, 1929

1,732,122

UNITED STATES PATENT OFFICE

ADOLPH L. DE LEEUW, OF PLAINFIELD, NEW JERSEY

TRANSMISSION SYSTEM

Application filed February 25, 1925. Serial No. 11,518.

This invention deals with transmission systems such, for example, as are utilized in machine-tools for ultimately imparting various movements to the work or the tool as the case may be. Such movements are relative and usually involve rotations and translations combined in selectively available ratios as well in forward as in reverse directions according to circumstances.

The general aim of this invention is to formulate an arrangement of fundamental structural simplicity and yet which will be highly adaptable in point of achieving a wide selection of ultimate movements. And it is also an object so to devise the system that its necessary manual control-levers will be reduced in number to a minimum.

The principles of this invention are well manifested in its utilization for drilling and tapping operations; especially where, as in tapping, the ratio of rotation to translation must be kept constant so long as the tool and the work are together, although several rates of translation should be independently available, i. e. for rapid-traverse towards the work, for slow feed while tooling the work, for backing out of the work at a faster-than-feed rate, and for rapid-traverse away after the tool has cleared the work. It is an object of this invention to accomplish these operations in orderly sequence; each change being effected by a single throw of the proper lever.

Now since such a machine cannot be expected always to handle the same tool and always to the same extent on an invariable class of work, an important objective in devising this transmission system is also to make it readily adjustable (1st) to provide a satisfactory range of feeds so that the drills or the tap, as the case may be, may be advanced into and out of the work as fast as conditions warrant and (2nd) to provide a series of selective ratios (of rotation to translation) yielding as many different helical effects as may be necessary to conform to the various pitches of such taps as the user would have ocasion to employ in threading one class of work or another. From the standpoint of cost, simplicity, etc., it is important that no more than the necessary number of sets of change-gears shall be used, and it is important that those sets shall be so arranged that they may be adjusted without confusing the user and, of course, without creating rates of movements in the various stages of operation of the machine incompatible with the requirements of the work being done.

How these and other objectives may be attained, will now be explained in the following specification of one concrete example of the invention as applied to a drilling and tapping mechanism; reference being had to the annexed drawings of which :—

To promote brevity and clearness, the essentials of this transmission system have been isolated from the more or less conventional elements of a machine-tool with which in practise this invention will be combined; it being sufficient to say that the machine will provide suitable supports for the work and for the tool, together with appropriate means such as a feed-screw or a rack or the like for bringing the supports towards and away from one another by a relative movement of translation, and the machine will likewise provide such journals and mountings as will provide for the relative rotation between the work and the tool.

Figure 1:
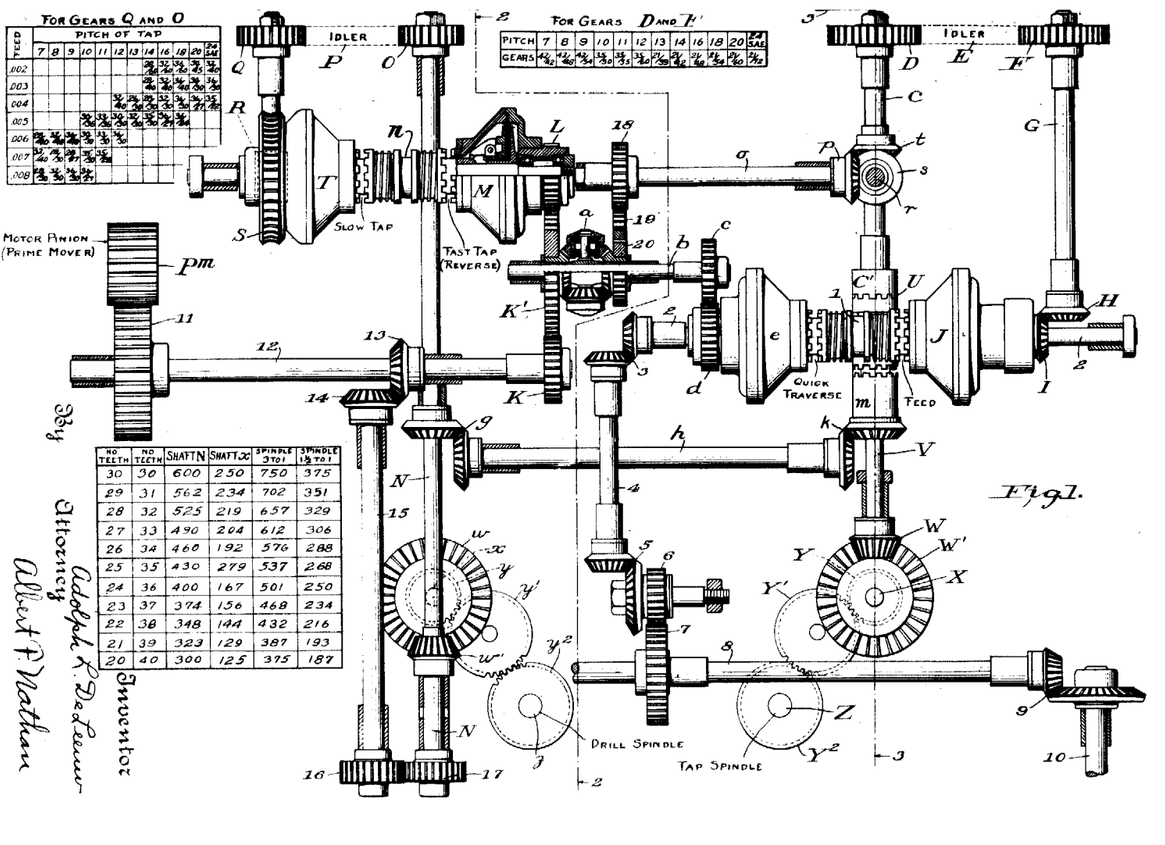
Fig. 1 is a diagrammatic lay-out of a transmission system embodying various combinations and sub-combinations characteristic of the phases of this invention.
Figures 2, 3:
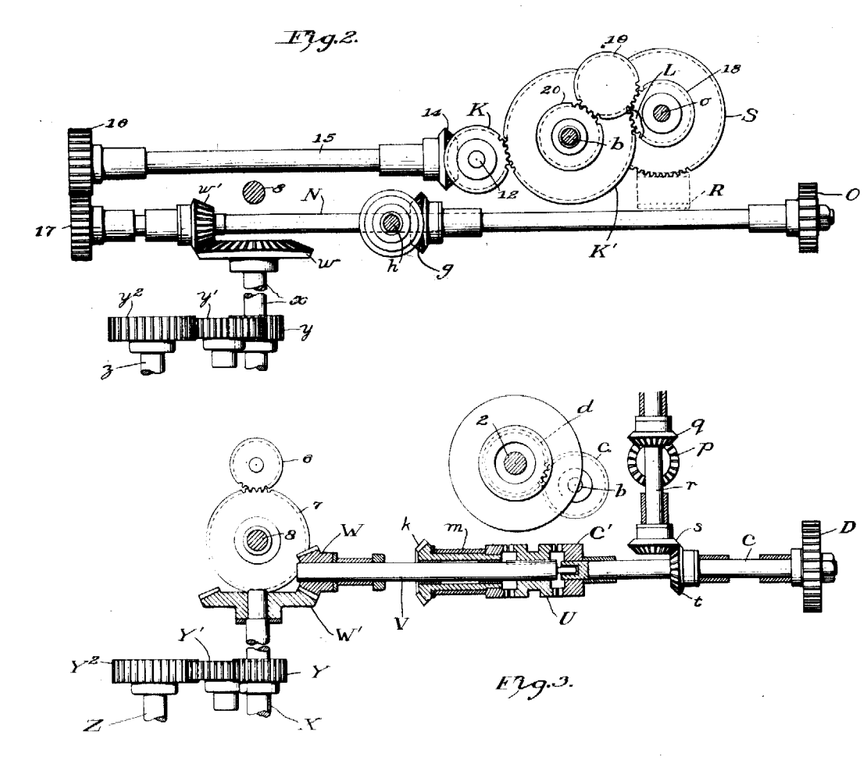
Fig. 2 and Fig. 3 are sectional elevations through line 2—2 and 3—3, respectively, of Fig. 1.

Those skilled in mechanics will therefore appreciate that what may be termed the ultimate "translation branch" of this transmission may terminate in a feed-screw 10 arranged to slide the head of a typical multiple spindle drilling-machine; two of such spindles being represented by z and Z. This translation branch may be said to start with the shiftable two-clutch collar 1 splined to shaft 2 and continue through the train of shafts and gears 3, 4, 5, 6, 7, 8, and 9.

Two other trains are alternatively available for imparting suitable speeds to the clutch collar 1; the first (comprising the differential unit a, shaft b, gears c, d and clutch e) imparting either forward or reverse motion at a quick-traverse rate. The second includes change-gears D, E, F, shaft G, gears H, I, and a clutch J and serves to impart a forward "feed" or a reverse motion at an intermediate rate; a peculiarity of this second train being that its relation to the means for rotating a certain spindle is such that the rotation has the same ratio to the translation of that spindle whether it be advanced slowly or withdrawn more rapidly, as will presently be more fully explained.

In simple drilling or other operations where the withdrawal of the tool from the work may be accomplished without the need of adhering to any particular helical effects, that part of the mechanism which maintains a constant ratio between the rotation and the translation during an increased rate of withdrawal may remain idle. The parts active under such conditions will first be described.

Driven by a suitable prime-mover such as a gear $P^m$ is a train of elements which may be regarded as a constant motion transmission; it including the gear 11, shaft 12, bevel-gears 13 and 14, and shaft 15 which are used to convey the motion for rotating and feeding the drills, or the drill and tap, or the tap, as the case may be. A branch extension of this constant motion transmission may be said to start with the shaft 12 and include the gear K, the gear K', the gear L and the clutch M which is driven by the gear L. The motion conveyed by this branch is, in one phase, used for rotating and translating the drill and tap out of the work, and in another phase, it is used for accomplishing a quick-traverse up after the tap has been separated from the work, and in that sense these elements are a part of a rapid traverse transmission.

For rotating the drill or drills, what may be termed a "speed" transmission is resorted to. This comprises the change-gears 16 and 17 which are variable to yield whatever speed the drill or other cutter is desired to have; the speed table on the drawing listing several ratios for said change-gears. This transmission also includes the shaft N, the bevel gears $w'$ and $w$, the shaft $x$, the gear-train $y$, $y'$ and $y^2$ and the drill-spindle $z$. This is a uniform speed transmission in the sense that, after the change-gears 16 and 17 have been once set, the spindle $z$ will adhere to its rate of rotation regardless of whether it is being translated at variable rates towards or into or out of or away from the work. It may here be noted that this system may be arranged to be very readily convertible either for multiple drilling operations, or for combined drilling and tapping operations. Thus, the shaft N drives a pair of bevel-gears $q$ which turn the shaft $h$ that drives the clutch $m$ through the bevel-gears $k$. A manually shiftable clutch collar U is splined to the shaft V and, when engaged with the clutch $m$, that shaft is driven at the constant speed determined by the change gears 16 and 17, and the spindle Z will be driven like the drill spindle $z$.

To rotate the helix-forming spindle, the ultimate transmission may comprise some means such as a dual clutch-collar $n$ for enabling that transmission to derive motion from a source of "feed" motion and a source of medium speed reverse motion; these being in this instance the clutches T and M as will presently appear. From this clutch-collar $n$ the transmission includes the shaft $o$ the gears $p$ $q$, the shaft $r$, the gears $s$ $t$ and the shaft C which has a clutch C' connecting it, through the collar U with the shaft V which drives the spindle Z through a suitable gear train W W' X Y and Y'.

What may be termed a factorial transmission intervenes between the aforesaid "ultimate" transmission and the "speed" transmission and comprises the shaft N, change-gears OPQ (which introduce the factors of feed and pitch), the worm R, the worm-wheel S and the terminal element T which is in the nature of a clutch. When this transmission is connected in operative series with the other two, the spindle Z will be rotated at a rate consistent with the achievement of a definite helical effect (prescribed by the setting of the change-gears OPQ) when the tool is advancing into the work at the rate of "feed" selected as best conforming to the requirements of the drill or other tool carried by the other simultaneously rotating spindle $x$. This can be made more apparent after an understanding has been gained of the bearing of the branch transmission from the gear D to the clutch J.

This may be termed the "pitch eliminating" transmission and it comprises the shaft C, the change-gears DEF (which eliminates one of the two factors introduced by the change-gears OPQ), the shaft G, the bevel-gears, H and I, and the terminal element J in the nature of a positive clutch whereby the motion for effecting the translation of the spindle Z is imparted to the initially described transmission beginning with clutch-collar 1. This is a ratio-maintaining transmission which is employed only when the tool is in the work; either cutting at "feed" rate under the control of the so-called "factorial" transmission, or retreating at a moderately fast rate through the motion conveyed by the constant motion branch transmission terminating in clutch M.

For imparting motion to the rapid-traverse line $a$ $b$ $c$ $d$ $e$, a differential arrangement is proposed. The forward rapid-traverse represents the differential effect of a first pair of intermediate transmissions and the reverse rapid-traverse is the differential effect of a second pair of intermediate transmissions. The first pair consists (1) of the constant speed line 12, K and K' and (2) of the line 12, 13, 14, 15, 16, 17, N, O, P, Q, R, S, T, $n$, $o$, 18, 19 and 20 which has its rate of motion determined by the factors selected for the speed, the feed and the pitch. The terminal elements of these lines are the gears K' and 20 of the differential device; which gears in this instance turn in the same direction but the rate of the gear 20 is only about a tenth of the rate of the gear K'. The second pair of intermediate transmissions comprise (1st) the above-mentioned constant speed line 12, K and K' and (2nd) the line 12, K, K', L, M, n, o, 18, 19 and 20 which is also a constant speed line but in which the terminal gear 20 rotates conversely to gear K' and at about twice its speed.

How these two pairs of translation lines are enabled to achieve either a forward or a reverse traverse at a rapid rate for all adjustments of the system will appear from the following analysis of the principles and modes of operation of this invention.

Where the machine is to be employed for drilling one hole and simultaneously tapping a pre-drilled hole, the problem solved by this mechanism involves several considerations:—

(1st) depending upon the size of the drill and the comparative toughness and hardness of the material being drilled, efficiency requires that the drill should rotate at a certain rate (generally called its "speed") and should for each revolution simultaneously advance into the material an appropriate distance conventionally termed its "feed." The speed of the drill will be adjusted primarily by the change-gears 16 and 17, and incidentally by a replacement of the gear train $x$, $y$, $y'$ and $y^2$ in some such manner as that indicated by the table adjacent those change gears.

Assume that the shafts 12 and 15 (and the gear K) are driven by the source of motion at the rate of K revolutions per minute. The shaft N will accordingly rotate at a rate equal to K times the teeth in gear 16 divided by the teeth in gear 17. This rate times the value of the train from the gear $w'$ to the drill, will represent the speed of the drill. If A represents the value of the gears 16 and 17, AK will be the rate of the shaft N and if B represents the value of the train from $w'$, then KAB will be the speed of the drill.

The translation between the drill and the work is always at the same rate as the translation between the tap (or other helix maker) and the work for the reason that, in this embodiment of the invention, the drill and the tap are assumed to be both mounted on a head which is bodily translated towards and away from the work. This translation takes place in two phases: (a) when the tool is free from the work and (b) when the tool is not free from the work. In phase (a) the translation will be rapid to save time and may be termed a "quick-traverse" up as well as down and, since the tool is free from the work in this phase, there need be no definite correlation between the rotation of the tool and its translation. In phase (b) however, the translation must be quite slow when the tool is cutting into the work, and it should be fairly rapid when the tool is being withdrawn from the work and, in each case, there must be a definitely maintained ratio between the translation and the rotation in order that the helical effect may be precisely maintained. The principles whereby this transmission system is enabled to satisfy the requirements of phase (b) will first be described.

Since both tools perform their respective cutting operations simultaneously, they must feed the same distance in the same time, and since the drill is to be fed and rotated at predetermined rates, and since the tap must rotate when cutting in a definite ratio to the rate of advance of the drill, it is desirable that the parts of the transmission which produce the ultimate helical effect shall derive motion from some element (as the shaft N) which has its rate of movement influenced by the change-gears 16 and 17 which determine the speed of the drill. And the motion thus initially derived must be evaluated in relation to the pitch of the helix to be cut, and the rate of rotation ultimately produced must be compatible with the rate of advance or feed predetermined for the drill.

Now, if the number of thousandths of an inch of feed per revolution of drill be represented by F, the feed of the drill in inches per revolution will be .00F. If the pitch (used herein to mean the number of convolutions per inch) of the tap be represented by P, its advance in inches per revolution will be $\frac{1}{P}$. Hence in the same interval of time, the revolutions of the drill will equal .00F×P revolutions of the tap, and this should be the value of the line of transmission elements from the drill spindle $z$ to the tap spindle Z. Since this value will be variable to satisfy different selections of feed and pitch, the line should include change-gears and these are indicated by QPO and located in the line between the drill-spindle and a clutch for reasons elsewhere explained. Since the line will, apart from those change-gears, ordinarily possess an arbitrary transmission constant (which may be represented by $f$) the ratio of the gear O to the gear Q multiplied by $f$ will equal .00F×P, i. e., $$\frac{O}{Q}f = .00FP.$$

In the instance shown by the drawings, $f$ is made a small fraction so as to keep the change-gears within convenient proportions, and its value is arbitrarily selected to correspond with an average pitch and feed, i. e., a pitch of 10 and a feed of .006 or a pitch of 12 and a feed of .005. In other words $$f = .00FP = .06 = \frac{6}{100} = \frac{3}{50}$$

which is the ratio of the worm R to the worm-wheel S; there being no other unbalanced constant in this embodiment between the drill and the tap in this particular line since the gear train $w'$ to $z$ is conversely equal to the gear train $W'$ to $Z$.

The change-gears O and Q accordingly will be selected to yield the ratio of $$\frac{O}{Q} = \frac{100}{6} \cdot 00 FP = \frac{FP}{60}.$$

Thus, with a feed of .005 and pitches 10, 11, 12 and 18, the values of the change-gears O and Q will be, respectively, $$\frac{50}{60} \quad \frac{55}{60} \quad \frac{60}{60} \quad \text{and} \quad \frac{90}{60}$$

which are in exact correspondence with the ratios $$\frac{30}{36} \quad \frac{33}{36} \quad \frac{30}{36} \quad \frac{36}{24}$$

shown by the table on the drawings adjacent those change gears.

It is noteworthy, at this point, that the change-gears O and Q need not coincide absolutely with the ratio determined for the selected feed; it being sufficient if they closely approximate it for the reason that the rate of cutting is an arbitrary figure based on a matter of judgment. This does not, as will be seen later, apply to the other set of change-gears D and F which must be exact inasmuch as they serve to maintain the predetermined helical effect with precision for all rates of advance or retreat of the tool while in contact with the work. Accordingly, in order to reduce to a minimum the number of spare gears for the change-gears O and Q, it will be sufficient to have available a comparatively small range of gears of various numbers of teeth; certain of which may be selected to yield a ratio close to that determined for a given feed. Thus, if a pitch of 13 and a feed of .005 is desired the exact ratio would be $$\frac{5 \times 13}{60} = \frac{32.5}{30}$$

which nearly equals the ratio of $\frac{32}{30}$ shown by the table and which actually would yield a pitch of 13 and a feed of .0049+ which would be amply close to .005.

The ratio characteristic of the gear-train DEF will now be explained. If D and F denote respectively the numbers of teeth in those gears, and if they be selected as equal, for each rotation of the spindle Z, it will feed a certain distance. If the constant ratio from the spindle Z to the shaft C be represented by $p$ and the constant from shaft C to the feed-screw 10 be represented by $p'$, then the travel for each rotation of the spindle will be $pp'$ inches and the shaft C will make $p$ rotations for each turn of the spindle Z.

Since the helix to be cut has a pitch P, the shaft C should turn $pP$ times for each inch of feed of the spindle Z, and the shaft must turn $\frac{1}{p'}$ times to feed the spindle one inch. The ratio of the gears D and F must accordingly be such that $$pP\frac{D}{F} = \frac{1}{p'}, \text{ and } \frac{D}{F} = \frac{1}{p} \times \text{a constant } \frac{p}{p'}.$$

In other words, the value of the gear-train is the product of the reciprocal of the pitch times whatever constant has been adopted for the machine and hence the change gears D and F are inversely proportional to whatever pitch of helix is to be cut. For example, in the particular instance shown on the drawings, this constant is seven so that the ratio of D to F will always equal seven times the reciprocal of the pitch. Thus with pitches of 7, 11 and 20, the values of $$\frac{D}{F} \text{ will be } \frac{7}{7}, \frac{7}{11} \text{ and } \frac{7}{20}$$

which correspond to the respective ratios of $$\frac{42}{42}, \frac{35}{55} \text{ and } \frac{21}{60}$$

shown on the table depicted for gears D and F.

The alternative condition of phase (b) may now be considered, i. e., the withdrawal at a medium rate of the tool while still in contact with the work. The motion now is derived independently of the change-gears O and Q but still under the control of the change-gears D and F. Through the idler K', the clutch M is rotated at the same rate as the shaft 12 and the gear K; to wit, at the constant rate of K revolutions per minute which is considerably greater than either the minimum or the maximum rates of clutch T. Thus, the maximum rate of clutch T within the ranges selected for the tables would be $$K\frac{30}{30} \times \frac{35}{22} \times \frac{3}{50} \text{ about } \frac{K}{10}$$

and the minimum rate would be $$K\frac{20}{40} \times \frac{30}{36} \times \frac{3}{50} = \frac{K}{40}.$$

So that the withdrawal will be accomplished at from ten to forty times as fast as the tap was driven to cut the helix in the hole; always preserving accurately the helical effect so that the retreating tool will pursue its original path and will not injure the helix.

Phase (2) may now be considered to show how the rapid traverse of the tool towards (but not into) the work is accomplished. Clutch T turns the shaft $o$ and gear 20 of the differential is thus rotated in the same direction as gear K' at a rate ranging from the minimum to the maximum speeds heretofore mentioned, to wit, at the rate .00FPK when the gears 16 and 17 are equal. The gear K' will rotate at the rate K$k$, where $k$ is the tooth ratio of the gear K to the gear K'. Hence, the planetary gear will be carried at the rate of one-half the algebraic sum of the speeds of gears K' and 20, i. e., $$\frac{1}{2}K(k + .00FP).$$

To explain by a concrete example:—In this embodiment, the gear K has 40 teeth, and the gear K' has 83; hence $$k = \frac{40}{83} = .482$$

and where the pitch is taken as 18 and the feed as 2, the gear 20 will be driven in the same direction as gear K' at the rate of .036K or at the rate of 21.6 revolutions if K be taken as 600 revolutions, the gear K' would be turning at the rate of 600$k$=289.2 revolutions. The resultant of these two rates is $\frac{1}{2}$ 310.8 or 155.4 revolutions per minute. In the alternative instance of phase ($a$) the shaft $o$ is driven by the clutch M which is driven by a gear-train from the shaft 12 in a direction converse to gear K'; hence the gear 20 will be rotated conversely to gear K' at the rate of K$m$, where $m$ is the value of that gear-train. The planetary gear (with its shaft $o$ will accordingly rotate at the rate $\frac{1}{2}K(k-m)$. In this example $m=1$ and hence that rate will be $$\frac{1}{2}K(.482-1) = \frac{1}{2}k \times .518 =$$
$$-.259K \text{ or } -155.4$$

which is the same amount (but reversely) as in the preceding example for the rapid traverse down.

In each case, the motion of the shaft $b$ is conveyed by the same transmission elements to the head to be translated.

By utilizing the principle of initially deriving a factorial motion for both the rotation and translation of a cutting operation from a member moving at a rate combining the two variables of pitch and feed, and by then using the factorial motion for effecting the rotation, and by also using this motion (after being modified by eliminating the variable factor of the pitch) for accomplishing the translation, and by using a differential motion (derived jointly from that factorial motion and an arbitrary constant motion) for effecting a rapid traverse when the tool and the work are disassociated, it becomes feasible to employ the same differential unit independently of said factorial motion for also yielding a reverse rapid traverse, and to use said arbitrary constant motion qualified in inverse proportion to the pitch, for accomplishing a moderately fast non-cutting translation while the tool and work are still associated and without departing from the helical effect. And another important structural consequence is that clutches may be used (between that part and a source of slow forward motion and another source of faster-reverse motion) for imparting different motions to said part without in any manner disturbing the correct relation of the tool to the work (the helical effect) on account of the necessarily existing back-lash up to that part or of the intervals of time lost when one clutch is opened and the other closed, and conversely.

Regarding the character of the clutches, it may be stated that it is essential that but one (that indicated by J) need be positive in the sense of being devoid of slippage when fully engaged. The others may be wholly of the friction or impositive type and may exhibit more or less slippage without in any manner impairing the accuracy of the helical effect that must be maintained so long as the tool is in the work. But it is desirable that all the clutches shall initially take hold impositively with some slippage to avoid unduly abrupt changes of motion, and it is desirable that they shall act positively when finally engaged to avoid the wear of creepage when running and, as to clutch T, to avoid any retardation in the rate of advance of the tools into the work which, although incapable of disturbing the helical effect, would not maintain the rate of feed and would to that extent render the operation undesirable especially if the slip of the clutch should be pronounced.

A type of clutch well adapted for a transmission system of the herein-disclosed nature may have the general construction illustrated on the drawings; to wit, embodying a friction element which first takes hold and a tooth-clutch which ultimately takes hold; thereby affording an impositive initial hold and a positive ultimate hold. Clutches of this type, being now conventional, are familiar to engineers and require no detailed description herein.

Regarding the shifting of the clutch-collars, it may be observed that they may be moved either manually or mechanically by conventional dogs to cause the machine to go through the cycle desired. The system exhibits a pronounced advantage in respect to the simplicity of the rule determining the positions of the clutch-collars, or clutch-shifting levers, as the case may be; the characteristic being that the machine may be caused to go through its successive stages by merely making a single shift of the appropriate one of the clutches for each operation as follows:

$$\frac{Tn}{el}\ \frac{M}{J} = \text{Rapid traverse down}$$

$$\frac{Tn}{e}\ \frac{M}{lJ} = \text{Feed into the work}$$

$$\frac{T}{e}\ \frac{nM}{lJ} = \text{Fairly fast retreat through the work}$$

$$\frac{T}{el}\ \frac{nM}{J} = \text{Rapid traverse up}$$

All translation will be arrested whenever the clutch-collar 1 is in neutral position, and all rotation of the spindle Z will cease whenever clutches T M and e are free to idle because then the shaft o will neither be driven through the differential train K' a 20 nor from the clutches T or M.

A remarkable quality of this system is that the successive stages in its operation are progressed through with the least possible number of alterations in the rate of rotation of the drill and the helix-maker. Thus, the drill spindle does not vary at all in its speed of rotation during any of the changes in the rate or direction of translation. The top spindle does not change its speed of rotation when the quick-traverse down changes to a feed down, and it does not change its speed of rotation when the medium traverse up changes to the quick-traverse up. As a consequence, the mechanism is enabled to function smoothly and is, for this and other reasons, singularly free from the burden of overcoming the inertia of rapidly rotating parts; all of which materially promotes its life and serviceability.

From the foregoing exposé of the structural arrangement and mode of operation of the elements of this system, it will be understood that, in the absence of any changes in the gear trains OPQ and DEF, it may be used for helical work of only one pitch and only one drilling feed by adopting a suitable value for the train i. e. the ratio of one thousand to the combined pitch and feed. This may be taken as the ratio of the worm and worm-wheel (when the value of the train is otherwise unity) and the mechanism may thus be greatly simplified and still used for combined drilling and tapping whenever but one pitch and but one feed are required; in which case a variety of speeds for the drill may still be had by retaining the change-gears 16 and 17.

Without further analysis, the foregoing will so fully reveal the gist of this invention that others can, by applying current knowledge, readily adapt it for various utilizations by employing one or more of the features that, from the standpoint of the prior art, fairly constitute essential characteristics of either the generic or specific aspects of this invention and, therefore, such adaptations should be, and are intended to be, comprehended within the meaning and range of equivalency of the following claims.

Having thus revealed this invention, I claim as new and desire to secure the following combinations and elements, or equivalents thereof, by Letters Patent of the United States:—

1. A transmission system combining a prime-mover; a spindle; a transmission extending therebetween and a clutch; a differential gear-set deriving motion from said transmission before and behind said clutch; and a transmission for translating said spindle, said transmission deriving motion from said differential gear-set and including a clutch.

2. A transmission system combining a prime-mover; a spindle; a transmission for rotating said spindle and serially including a worm, a worm-wheel, a clutch and a shaft; and a transmission for translating said spindle deriving motion from said shaft and including a clutch.

3. A transmission system combining a prime mover; a spindle; a transmission for rotating said spindle and serially including a pinion, an intermediate gear, a clutch element having a gear, a clutch collar and a shaft; and a transmission for translating said spindle deriving motion from said shaft and serially including a train of gears and a clutch.

4. A transmission system combining a prime-mover; a spindle; a transmission including a clutch; a shunt transmission driven by said first transmission and shunting said clutch and including a differential gear-set; and a transmission for translating said spindle deriving motion from said differential and including a clutch.

5. A transmission system combining a prime-mover; a spindle; a transmission therebetween for rotating said spindle and including a clutch; a differential gear-set deriving motion from said transmission before and behind said clutch; a first branch-transmission deriving motion from said differential gear-set and terminating in a second clutch; a second branch-transmission deriving motion from said first transmission behind said second clutch and terminating in a third clutch; and a transmission for translating said spindle adapted to derive motion selectively either from said second or from said third clutches.

6. A transmission system combining a prime-mover; a spindle; a bifurcated transmission deriving motion from said prime-mover, its first branch including a worm and worm-wheel and terminating in a first clutch, and its second branch terminating in a second clutch; a transmission for rotating said spindle adapted to derive motion selectively from either of said clutches; and a transmission for translating said spindle deriving motion from said last-mentioned transmission and serially including a train of gears and a clutch.

7. A transmission system combining a prime-mover; a spindle; a spindle-rotating transmission including a clutch; a differential gear-set deriving motion from said transmission before and behind said clutch; a pair of clutches, the one deriving motion from said differential gear-set and the other from said transmission behind said clutch; and a transmission for translating said spindle adapted to derive motion selectively from either one of said pair of clutches.

8. A transmission system combining a prime-mover; a spindle; a first pair of clutches; a bifurcated transmission deriving motion from said prime-mover; its one branch terminating in the one clutch and its other branch terminating in the other clutch; a spindle-rotating transmission adapted to derive motion selectively from either one of said clutches; a shunt transmission including a differential gear-set adapted to derive motion both from said bifurcated transmission and from said spindle-rotating transmission; a second pair of clutches; the one deriving motion from said differential gear-set and the other from said spindle-rotating transmission; and a spindle-translating transmission adapted to derive motion selectively from either of said second pair of clutches.

9. A transmission system combining a prime-mover; a spindle; a pair of clutches; a bifurcated transmission having its branches leading from said prime-mover to said respective clutches; a spindle-rotating transmission driven selectively by either of said clutches; a differential gear-set deriving motion from both of said transmissions and a spindle-translating transmission deriving motion from said differential gear-set and including a clutch.

10. A transmission system combining a prime-mover; a spindle; a pair of clutches; a spindle-rotating transmission driven selectively by either of said clutches; a tri-furcated transmission deriving motion from said prime-mover and having two of its branches terminating in the respective clutches, and having its third branch leading through a differential gear-set to said spindle-rotating transmission; a second pair of clutches, the one deriving motion from said differential gear-set and the other from said spindle-rotating transmission; and a spindle-translating transmission driven selectively by either of the clutches of said second pair.

11. A transmission system combining a prime-mover; a spindle; a transmission line extending therebetween and serially including a shaft, a set of change-gears, a clutch and a pinion; a shunt transmission extending from said shaft to said pinion and including a differential gear-set; and a transmission for translating said spindle, said transmission deriving motion from said differential gear-set and including a clutch.

12. A transmission system combining a prime-mover; a spindle, a transmission for rotating said spindle and serially including a set of change-gears, a clutch and a shaft; and a transmission for translating said spindle deriving motion independently of said spindle from said shaft and serially including a set of change-gears and a clutch.

13. A transmission system combining a prime-mover; a spindle; a transmission for rotating said spindle and serially including a clutch and a shaft; and a transmission for translating said spindle deriving motion independently of said spindle from said shaft and serially including a set of change gears and a clutch.

14. A transmission system combining a prime-mover; a spindle; a transmission serially including a shaft; a worm, a worm-wheel, a clutch and a pinion; a shunt transmission between said shaft and said pinion and including a differential gear-set; and a transmission for translating said spindle deriving motion from said differential and including a clutch.

15. A transmission system combining a prime-mover; a spindle; a transmission therebetween for rotating said spindle and serially including a shaft; a set of change-gears; a clutch, a pinion and a shaft; a shunt transmission between said first shaft and said pinion and including a differential gear-set; a first branch-transmision deriving motion from said differential gear-set and terminating in a second clutch; a second branch-transmission deriving motion from said second shaft and including a set of change-gears and terminating in a third clutch; and a transmission for translating said spindle adapted to derive motion selectively either from said second or from said third clutches.

16. A transmission system combining a prime-mover; a spindle; a bifurcated transmission deriving motion from said prime-mover, its first branch including a set of change-gears and terminating in a first clutch, and its second branch terminating in a second clutch; a transmission for rotating said spindle adapted to derive motion selectively from either of said clutches; and a transmission for translating said spindle deriving motion independently of said spindle from said last-mentioned transmission and serially including a set of change-gears and a clutch.

17. A transmission system combining a prime-mover; a spindle; a spindle-rotating transmission serially including a gear; a clutch; a pinion and a shaft; shunt transmission between said gear and said pinion and including a differential gear-set; a set of change-gears; a pair of clutches, the one deriving motion from said differential gear-set and the other from said shaft through said set of change-gears; and a transmission for translating said spindle adapted to derive motion selectively from either one of said pair of clutches.

18. A transmission system combining a prime-mover; a spindle; a first pair of clutches; a bifurcated transmission deriving motion from said prime-mover; its one branch including a set of change-gears and terminating in the one clutch and its other branch terminating in the other clutch; a spindle-rotating transmission adapted to derive motion selectively from either one of said clutches and including a pinion; a shunt transmission including a differential gear-set adapted to derive motion both from said bifurcated transmission and from said spindle-rotating transmission; a second pair of clutches; the one deriving motion from said differential gear-set and the other from said spindle-rotating transmission through a set of change-gears; and a spindle-translating transmission adapted to derive motion selectively from either of said second pair of clutches.

19. A transmission system combining a prime-mover; a spindle; a pair of clutches; a bifurcated transmission leading from said prime-mover to said clutches; a set of change-gears in one of the branches of said transmission; a spindle-rotating transmission driven selectively by either of said clutches; a differential gear-set deriving motion from both of said transmissions; and a spindle-translating transmission deriving motion from said differential gear-set and including a clutch.

20. A transmission system combining a prime-mover; a spindle; a pair of clutches; a spindle-rotating transmission driven selectively by either of said clutches; a trifurcated transmission deriving motion from said prime-mover and having its one branch terminating in one clutch, having its other branch leading through a set of change-gears to the other clutch, and having its third branch leading through a differential gear-set to said spindle-rotating transmission; a second pair of clutches, the one deriving motion from said differential gear-set and the other from said spindle-rotating transmission through a set of change-gears; and a spindle-translating transmission driven selectively by either of the clutches of said second pair.

21. A mechanism combining a carrier; a transmission system for producing translations thereof and combining four clutches such as T, M, e and J; said system comprising transmission means effective to produce a rapid traverse down of said carrier when clutches T and e are closed: transmission means for producing a slow feed down of said carrier when clutches T and J are closed; transmission means for producing an intermediate traverse up of said carrier when clutches M and J are closed; and transmission means for producing a rapid traverse up of said carrier when clutches M and e are closed.

22. A machine for rotating and translating a tool combining a transmission for producing helical effects by correlating said motions and embodying two clutches, the one driven forwardly at a rate proportional to the product of the pitch of the helix and the desired rate of feed; and the other driven reversely at a more rapid rate; a transmission for rotating the tool and adapted to derive its motion from either the one or the other of said clutches; and a branch transmission deriving its motion from an element of said first transmission and evaluated to translate the tool at said desired rate of feed when said first transmission is deriving its motion from the first-mentioned clutch.

23. A machine for rotating and translating a tool combining a transmission for producing helical effects by correlating said motions two clutches, the one driven forwardly at a rate proportional to the product of the pitch of the helix and the desired rate of feed; and the other driven reversely at a more rapid rate; a transmission for rotating the tool and adapted to derive its motion from either the one or the other of said clutches; and a branch transmission deriving its motion from an element of said first transmission and evaluated in inverse proportion to the aforesaid pitch.

24. A machine for translating and rotating a tool combining a transmission for producing helical effects by correlating said motions and combining two clutches, the one driven forwardly at a rate variable in proportion to the product of the pitch of the helix and the desired rate of feed; and the other driven reversely at a more rapid constant rate; a transmission for rotating the tool and adapted to derive its motion from either the one or the other of said clutches; and a branch transmission deriving its motion from an element of said first transmission and evaluated to translate the tool in a constant ratio to its rate of rotation.

25. A mechanism combining a carrier; a transmission system for producing translations thereof and combining four clutches such as T, M, e and J, the clutch M having a constant rate of rotation; said system comprising transmission means effective to produce a rapid traverse down of said carrier when clutches T and e are closed; means for producing a slow feed down when clutches T and J are closed; differential means for producing an intermediate traverse up of said carrier when clutches M and J are closed; and differential means for producing a rapid traverse up of said carrier when clutches M and e are closed.

26. A machine combining a tool-carrier; a transmission system for rotating and translating said tool-carrier and combining a first, a second, a third and a fourth clutch; means effective when said first and fourth clutches are closed to rotate and translate slowly down said tool carrier and effective when said second and said fourth clutches are closed more rapidly both to rotate and translate it up, said means being adapted in each instance to maintain the same ratio in the rates of rotation to translation; and means for producing a higher rate of translation down and up respectively when said third clutch is closed and said first and second clutches are alternately closed.

27. A transmission system combining a clutch; a shaft; a differential gear-set reversely geared to said shaft and geared to said clutch in a lower ratio; means alternatively available either for driving said shaft through said clutch or more slowly independently thereof; a driven element; and means for driving it either from said shaft or from said differential.

28. A machine combining a carrier; a transmission system for producing translations of said carrier and combining a first pair of opposed clutches such as T and M; a second pair of opposed clutches such as e and J; two clutch-collars, the first for engaging either of the clutches of the first pair, and the second of the second pair; said system comprising transmisison means effective to produce a rapid traverse down of said carrier when clutches T and e are engaged with the respective collars; means for producing a slow feed down of said carrier when clutches T and J are engaged with the respective collars; means for producing an intermediate traverse up of said carrier when clutches M and J are engaged with the respective collars; and means for producing a rapid traverse up said carrier when clutches M and e are engaged with the respective collars.

In witness whereof, I have hereunto subscribed my name.

ADOLPH L. DE LEEUW.

Certificate of Correction

Patent No. 1,732,122.                             Granted October 15, 1929, to

ADOLPH L. DE LEEUW

It is hereby certified that error appears in the printed specification of the above numbered patent requiring correction as follows: Page 4, lines 72 to 75, strike out the formula and insert instead:

$$pP\frac{D}{F}=\frac{1}{p'}, \text{ and } \frac{D}{F}=\frac{1}{P} \times \text{a constant } \frac{p}{p'}$$

Page 5, line 41, in the formula for "$k \times .518=$" read "$K \times .518=$"; page 6, line 26, for the word "top" read *tap;* and that the said Letters Patent should be read with these corrections therein that the same may conform to the record of the case in the Patent Office.

Signed and sealed this 12th day of November, A. D. 1929.

[SEAL]                                                  M. J. MOORE,
*Acting Commissioner of Patents.*